(No Model.)
C. N. WILCOX.
FISHING REEL.
No. 477,196. Patented June 14, 1892.
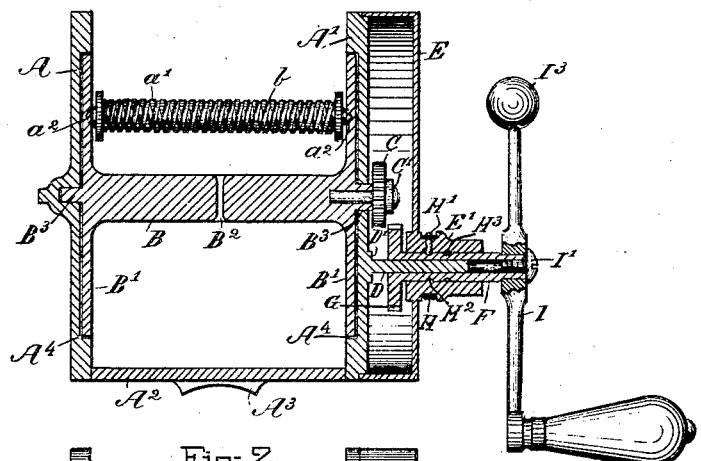
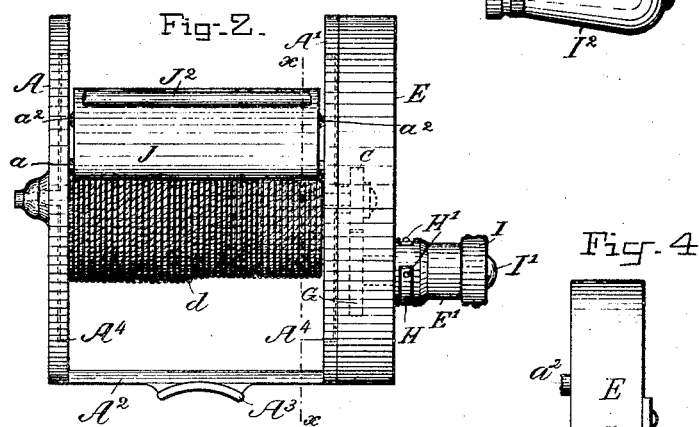
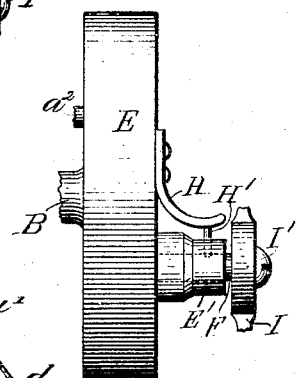
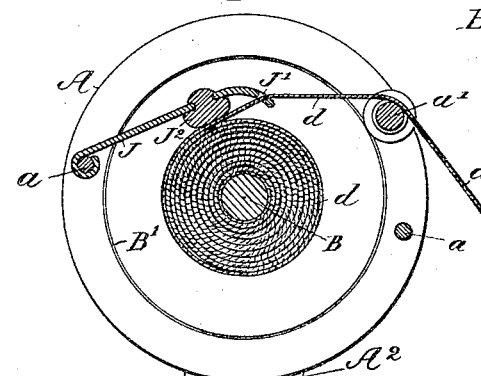
WITNESSES:
Ernst Lundgren
INVENTOR.
Curtis N. Wilcox
By A. P. Thayer
atty

UNITED STATES PATENT OFFICE.

CURTIS N. WILCOX, OF BROOKLYN, NEW YORK, ASSIGNOR TO DEBORAH C. FOLK, OF SAME PLACE.

FISHING-REEL.

SPECIFICATION forming part of Letters Patent No. 477,196, dated June 14, 1892.

Application filed December 4, 1889. Renewed February 2, 1891. Serial No. 379,918. (No model.)

*To all whom it may concern:*

Be it known that I, CURTIS N. WILCOX, a citizen of the United States, residing at Brooklyn, in the county of Kings and State of New York, have invented new and useful Improvements in Fishing-Reels, of which the following is a specification.

This invention relates to certain new and useful improvements in reels; and it has for its object, among others, to provide simple and cheap yet efficient means for withdrawing the handle and the pinion employed for winding up the line from engagement with the pinion upon the spool, so that the line may be cast or thrown out farther and more freely with a minimum of drag and resistance from the spool, but which may be made to readily engage with the pinion on the spool by slight pressure longitudinally, so that the turning of the handle will at once begin to wind in or up the line. I provide a catch or other means to hold the parts in either of their positions. I also provide a simple and efficient brake mechanism adapted to be manipulated by finger or thumb to press it against the line as the latter runs out to prevent too rapid delivery. The brake mechanism is also provided with a wearing-pad detachably connected for renewal and preferably being an absorbent pad to absorb the moisture from the wet line when being reeled in to prevent the coils from sticking together, as when reeled without removal of the water; and I also provide a traverse-guide for laying the line on the spool, consisting of a right and left spirally-grooved roll pivoted independently in the reel-heads in such a manner that the line runs over and rotates it when being drawn in, so that the said roll serves for such a guide without the reversing guide-tongue commonly used and without said roll being geared with the spool or crank.

Other objects and advantages of the invention will appear in the following description, and the novel features thereof will be particularly pointed out in the claims.

The invention is clearly illustrated in the accompanying drawings, in which—

Figure 1 is a central longitudinal section through a reel embodying my improvement. Fig. 2 is a side elevation of the same with the line wound on and with the handle broken off and showing the brake attachment. Fig. 3 is a section through the line $x\,x$ of Fig. 2. Fig. 4 is a detail in side elevation showing a modified arrangement of the spring-holder for the shifting sleeve by which the handle and reel are connected and disconnected.

A and A' are the two end pieces of the frame, secured together by rods, as $a$, or in any manner common in this class of devices, and by a strip $A^2$, which carries the curved piece $A^3$, as usual, to fit the rod, to which it is attached in any ordinary manner. The adjacent faces of the end pieces A A' are halved out, as shown at $A^4$, to provide for the reception of the end pieces B' of the spool B, said spool being provided with the usual opening $B^2$ for the passage of the end of the line $d$ to be secured thereto. This spool has suitable bearings $B^3$ in the ends of the frame, as shown in Fig. 1, and at one end is provided with a pinion C, carried by a suitable pintle or pin C', or it may be a screw passed through the hub of the pinion and into the spool, as seen in Fig. 1, the said pinion being arranged to rotate with the spool, which is free to rotate in its bearings. At the same end of the frame there projects from the end piece A' a shaft D, formed with a boss D' to prevent the binding of a pinion (hereinafter described) against the said end piece.

E is a casing at the pinion end of the frame and provided with an exterior boss or hub E', through which passes the sleeve F, which is sleeved upon the shaft D and carries at its inner end within the casing a pinion G, designed to mesh when desired with the pinion C of the spool. This sleeve is free to be moved longitudinally back and forth upon the shaft D within the hub E' and may be held in either its inner or outer position in any suitable manner. I have shown one form of holder in Figs. 1 and 2 of the drawings, which consists of a spring-arm H, attached at one end to the hub of the casing and extending partly around the hub E' and at its free end carrying a pin H', arranged in a radial hole of the hub substantially at right angles to the axis of the shaft and sleeve, and the free end of the pin being rounded, as shown clearly in Fig. 1, and bearing against the sleeve by the pressure of the spring-arm, and in Fig. 4 I represent a modified form of said holder, in which the spring-arm H is attached to the side of casing E in a radial line of the hub E', with its free end bent suitably for bearing on the outer end of pin H'.

The hub has an annular groove extending almost around it and being of a sufficient depth and width to let the spring in flush with the surface to protect the spring from external interfering contact.

The sleeve is provided with two annular grooves H², H³, the same being rounded, as shown, and the pin H' is designed to engage either one or the other of these grooves and to hold the pinion G either in or out of mesh with the pinion C. The outer end of the sleeve is designed to receive the handle-bar I, which may be attached thereto in any suitable manner. It is shown in the drawings as provided with a squared end to fit a corresponding socket in the handle-bar and held by means of a screw I'; but any other suitable connection of these parts may be employed. This handle-bar is provided at one end with a handle I² and at the opposite end with a weight I³.

In operation, when it is desired that the line should be run out freely, the handle, with its attached sleeve and pinion, is pulled into the position in which it is shown in the full lines in Fig. 1, disengaging the pinions C and G, leaving the line free to run out with a minimum friction. When it is desired to wind up the line, the handle and its sleeve and pinion are pushed in into the position shown in Fig. 2, the pinion G meshing with the pinion C, whereby the rotation of the handle causes the spool to rotate, and consequently winds up the line. The pin H' is so arranged that it will readily disengage itself from the groove in which it is seated as the sleeve is moved in or out and automatically seat itself in the other groove as the parts reach their proper positions. The engaging ends of the teeth of both of the pinions G and C are preferably chamfered to aid their meshing with each other whenever the pinion G is moved into contact with the pinion C.

J is a brake, which may be of any suitable material, pivoted at one end on one of the rods a, which connect the end pieces of the frame, and extending forward in the direction of the outhanging line, so that the thumb may press the forward part against the line as the latter runs out to prevent too rapid delivery. A suitable transverse aperture J' is provided in this brake in any suitable manner and through which the line may pass. This slot may be formed in any suitable manner, either in that shown in Fig. 3, or it might, for instance, be formed by two parallel wires, between which the line might run.

J² is a detachably-connected pad, as leather or other approved material, that will have retarding effect on the line with the minimum of wear of the line. In practice it will be preferred that it shall be an absorbent pad of felt or any other suitable absorbent material. This pad is designed to form the bearing-surface of the brake on the line and to absorb the moisture from the line when the latter is coming in from the water, and thus better obviate the sticking of the line when running out afterward, the resting of the pad upon the line or the pressing of the pad upon it by reason of the drag of the outhanging line extending through the slot in the end of the hinged brake producing contact of the pad with the line without any thumb or finger pressure being necessary. Running the line through the slot of the brake also facilitates coiling it properly on the reel.

The pad may be detachably connected in any approved way; but in this case I represent it as secured by a kind of T-head along the back a little wider than the slot and crowded through the slot of the brake-plate and expanded above. When the pad is worn out, it may be readily replaced by a new one.

In Fig. 1 I have represented a line-guide to guide the line while it is being wound in and to lay it evenly along on the spool. It consists of a roll $a'$, having an exterior combined right and left screw-thread or groove $b$. This roll is arranged on pivots $h^3$ between the heads and in advance of the guide-slot J' in the brake and independently of the spool and crank. The groove in one direction should preferably be somewhat deeper than that in the other direction. This roll will serve effectually to guide the line evenly along on the spool, alternating from one end to the other, the hand holding the rod and reel aiding in the giving, keeping, and changing direction by inclining the reel sufficiently for that purpose to or from the direction in which the outhanging part of the line may be at the time. Such rolls having right and left grooves have been used in various machines as a means of operating a traverse-guide to carry a line back and forth for laying it on a spool, said guide having a guideway for it to run on and a shifting tongue to run in the grooves and shift from one to the other at each end for reversing the movement, said roll being geared with the spool or crank for being rotated, and I do not claim such a roll broadly, my invention consisting in the contrivance of such a roll with the spool, so as to utilize it for my purpose without the necessity of the line-guide and its slideway, which I accomplish by the simple arrangement of the roll, so that the line draws over and against it in winding in with sufficient tension to follow in the grooves and cause the roll to rotate, whereby it will be seen that the roll, always turning at the same speed as the line runs, will traverse the line uniformly, whereas with such a roll working a guide and geared with the spool the speed of the roll is always at variance with that of the line. This roll may be of brass, wood, rubber, or any other suitable material.

Although less desirable and less efficient and durable than the construction shown and described, rod D might be dispensed with and sleeve F, either as a sleeve or solid shaft, be supported entirely within and by hub E' as its bearing, and if a sleeve in such case the spring might be inside of its bore and the grooves in the bore of the hub; or the rod D might have the spring with catch recessed in it and the grooves be in the bore of the sleeve F.

Various modifications in detail may be resorted to without detracting from the essence of or departing from the spirit of the invention.

I claim—

1. The combination, with the spool, its frame, and the pinion on the spool, of a shaft rigid with the end piece of the frame, a sleeve movable on said shaft and carrying a pinion, and a handle upon said sleeve and adapted to rotate it or to move it lengthwise upon the shaft, substantially as described.

2. The combination, with a spool and its frame, of a pinion carried by said spool, a shaft rigid with one of the end pieces of the frame, a casting having a hub or boss, a sleeve in said boss upon said shaft and movable lengthwise upon said shaft, and a pinion carried by the inner end of said sleeve, substantially as described.

3. The combination, with the frame, the spool, and the pinion carried thereby, of the casing formed with the boss, the sleeve passed through said boss and carrying at one end within said casing a pinion and at the other end a handle, and a shaft upon the end piece of the frame and passed through said sleeve and boss and upon which the sleeve is longitudinally adjusted, substantially as and for the purpose specified.

4. The combination, with the frame, the spool, and its pinion, of the winding-pinion carried by a shaft adjustable to and from the spool-pinion and provided with annular grooves, and a spring-catch adapted to engage either one of said grooves to hold the shaft in either of its adjusted positions, substantially as described.

5. The combination, with the frame, the spool, and its pinion, of the winding-pinion carried by a shaft adjustable to and from the spool-pinion, a spring-catch, and grooves to receive the catch in the relation thereto to engage and retain the winding-pinion in or out of contact with the spool-pinion, substantially as described.

6. The combination, with the spool and its winding mechanism, of a hinged brake attached to the frame of the spool to swing on its pivot, with its free end in advance of the spool and provided with a detachable pad to bear on the line, substantially as described.

7. The combination, with the spool, of a pivoted lever-brake normally gravitating onto the spool, with its free end extending in the direction of the outhanging line and arranged to bear on the line, as set forth.

8. The combination, with the spool, its frame, and winding mechanism, of a brake provided with a detachable pad, substantially as described.

9. The combination, with the spool and its winding mechanism, of a hinged brake attached to the frame of the spool to swing on its pivot, with its free end in advance of the spool and arranged to bear on the line, as set forth.

10. In combination with a reel and its winding mechanism, an adsorbent pad supported by the frame of the reel in yielding contact with the line, substantially as described.

11. In combination with a reel and its winding mechanism, an absorbent pad attached to a support hinged to the frame of the reel and held thereby in yielding contact with the line, substantially as described.

12. The combination, with the spool, its frame, and winding mechanism, of a brake provided with an absorbent pad, substantially as described.

13. The combination, with the spool, its frame and winding mechanism, of a hinged brake on the frame and an absorbent pad carried by the brake, substantially as and for the purpose specified.

14. The combination, with the reel, the frame, and the spool-winding mechanism, of a brake adapted to bear upon the line and formed with a transverse passage for the line, substantially as described.

15. The combination, with the reel and its frame, of a hinged brake adapted to bear upon the line and provided with an absorbent pad and a transverse passage for the line, substantially as described.

16. In combination with a reel and its winding mechanism, a brake consisting of a rest or drop supported by the frame of the reel and provided with a transverse slot or passage in the relation to the spool, whereby the line may pass through said slot close to and directly onto the coil of wound-in line in winding it in, substantially as described.

17. In combination with a reel and its winding mechanism, a brake consisting of a rest or drop hinged to the frame of the reel and provided with a transverse slot or passage in the relation to the spool, whereby the line may pass through said slot close to and directly onto the coil of wound-in line in winding it in, substantially as described.

18. In combination with a reel and its winding mechanism, a hinged drop or rest supported by the frame of the reel and provided with an absorbent pad and with a transverse slot or passage in advance of the pad, substantially as described.

19. The combination, with the spool, of the traverse-guide for the line, consisting of the right and left spirally-grooved and independently-pivoted roll, said roll alone constituting the guide whereby the line draws over and rotates said roll and thereby traverses the grooves when reeling in, substantially as described.

20. The combination, with the spool, of the traverse-guide for the line, consisting of the right and left spirally-grooved roll pivoted independently in the reel-frame parallel with the spool, said roll alone constituting the guide whereby the line is caused to draw over and rotate the roll and thereby traverse the same in the grooves when reeling in, substantially as described.

21. The combination, with the spool, of the traverse-guide for the line, consisting of the right and left spirally-grooved roll, said roll alone constituting the guide, and the hinged drop or rest having a transverse slot or passage through which the line may pass, substantially as described.

In testimony whereof I affix my signature in presence of two witnesses.

CURTIS N. WILCOX.

Witnesses:
J. E. FOLK,
E. W. BEACH.